US010757076B2

(12) United States Patent
Khare et al.

(10) Patent No.: US 10,757,076 B2
(45) Date of Patent: Aug. 25, 2020

(54) ENHANCED NETWORK PROCESSING OF VIRTUAL NODE DATA PACKETS

(71) Applicant: Nicira, Inc., Palo Alto, CA (US)

(72) Inventors: Shrikrishna Khare, Sunnyvale, CA (US); Ayyappan Veeraiyan, Cupertino, CA (US); Craige Wenyi Jiang, Fremont, CA (US); Guolin Yang, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 363 days.

(21) Appl. No.: 15/655,422

(22) Filed: Jul. 20, 2017

(65) Prior Publication Data
US 2019/0028435 A1   Jan. 24, 2019

(51) Int. Cl.
*H04L 29/06* (2006.01)
*G06F 9/455* (2018.01)

(52) U.S. Cl.
CPC ...... *H04L 63/0236* (2013.01); *G06F 9/45558* (2013.01); *H04L 63/0263* (2013.01); *G06F 2009/45595* (2013.01); *H04L 63/164* (2013.01)

(58) Field of Classification Search
CPC ..... H04L 63/00; H04L 63/02; H04L 63/0227; H04L 63/0263; H04L 63/0236
See application file for complete search history.

(56) References Cited

U.S. PATENT DOCUMENTS

| 7,710,871 | B2 * | 5/2010 | Lavian | H04L 47/10 370/229 |
| 8,892,706 | B1 * | 11/2014 | Dalal | H04L 12/4641 709/223 |
| 9,178,850 | B2 * | 11/2015 | Lain | H04L 45/02 |
| 9,762,490 | B2 * | 9/2017 | Valencia Lopez | H04L 45/745 |
| 2007/0294085 | A1 * | 12/2007 | Gaos | H04L 12/66 704/252 |
| 2009/0254990 | A1 * | 10/2009 | McGee | G06F 21/51 726/22 |
| 2014/0056151 | A1 * | 2/2014 | Petrus | H04L 69/22 370/242 |
| 2015/0055456 | A1 * | 2/2015 | Agarwal | H04L 49/9047 370/230 |
| 2015/0082370 | A1 * | 3/2015 | Jayaraman | H04L 63/20 726/1 |
| 2017/0099365 | A1 * | 4/2017 | Jain | H04L 67/1095 |
| 2018/0063000 | A1 * | 3/2018 | Wu | H04L 41/0816 |
| 2018/0129978 | A1 * | 5/2018 | Vigoda | G06N 7/005 |
| 2018/0191849 | A1 * | 7/2018 | Xu | H04L 67/22 |

* cited by examiner

*Primary Examiner* — Khang Do

(57) ABSTRACT

Described herein are systems, methods, and software to enhance the management of packet filters for host computing systems. In one implementation, a method of managing packet filters for a physical network interface on a host computing system includes obtaining dispatch statistics for media access control (MAC) addresses associated with virtual nodes communicating over the physical network interface via a virtual switch. After obtaining the dispatch statistics, the method further provides identifying a filter configuration based on the dispatch statistics, wherein the filter configuration classifies received packets at the physical network interface into processing queues based on attributes identified in the received packets, and applying the filter configuration in the physical network interface.

18 Claims, 7 Drawing Sheets

VIRTUAL SWITCH DATA STRUCTURE
400

| MAC ADDRESSES 410 | VNIC PORT ID 412 | DISPATCH STATS 414 |
|---|---|---|
| MAC 420 | VNIC ID 430 | STATS |
| MAC 421 | VNIC ID 431 | STATS |
| MAC 422 | VNIC ID 432 | STATS |
| MAC 423 | VNIC ID 433 | STATS |
| MAC 424 | VNIC ID 434 | STATS |

FIGURE 4

ENHANCED NETWORK PROCESSING OF VIRTUAL NODE DATA PACKETS

BACKGROUND

In computing environments, virtual switches may be used that comprise software modules capable of providing a communication platform for one or more virtual nodes in the computing environment. These virtual switches may provide switching operations, routing operations, distributed firewall operations, and the like, and may be used to intelligently direct communication on the network by inspecting packets before passing them to other computing nodes (both real and virtual). For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like within the data packet and, when identified, provide a set of actions to be asserted against the data packet. These actions may include modifications to the data packet, and forwarding rules for the data packet, amongst other possible operations.

In some implementations, to provide the virtual switching operations, the virtual switch may be required to transfer and receive packets for the virtual nodes over a physical network interface of the host computing system. To support the communication of these packets over the physical network interface, the host may be capable of configuring the physical network interface to maintain a quality of service for packets destined for the virtual nodes. However, difficulties arise in identifying currently executing nodes on the host. In particular, traditional configuration operations for physical network interfaces are incapable of identifying secondary virtual nodes nested within a primary virtual node, and may further have difficulties identifying packets within overlay network headers. As a result, traditional filtering configurations may be incapable of classifying data packets for the nested virtual nodes as well as packets nested within an overlay header.

OVERVIEW

The technology disclosed herein enhances the management of data packet communications for virtual nodes over a physical network interface. In one implementation, a method of managing packet filters for a physical network interface of a host computing system includes obtaining dispatch statistics for media access control (MAC) addresses associated with virtual nodes communicating over the physical network interface via a virtual switch. The method further includes identifying a filter configuration based on the dispatch statistics, wherein the filter configuration classifies received packets at the physical network interface into processing queues based on attributes identified in the received packets, and applying the filter configuration in the physical network interface.

BRIEF DESCRIPTION OF THE DRAWINGS

FIG. 4 illustrates a virtual switch data structure to manage dispatch statistics according to an implementation.

DETAILED DESCRIPTION

Figure 1:
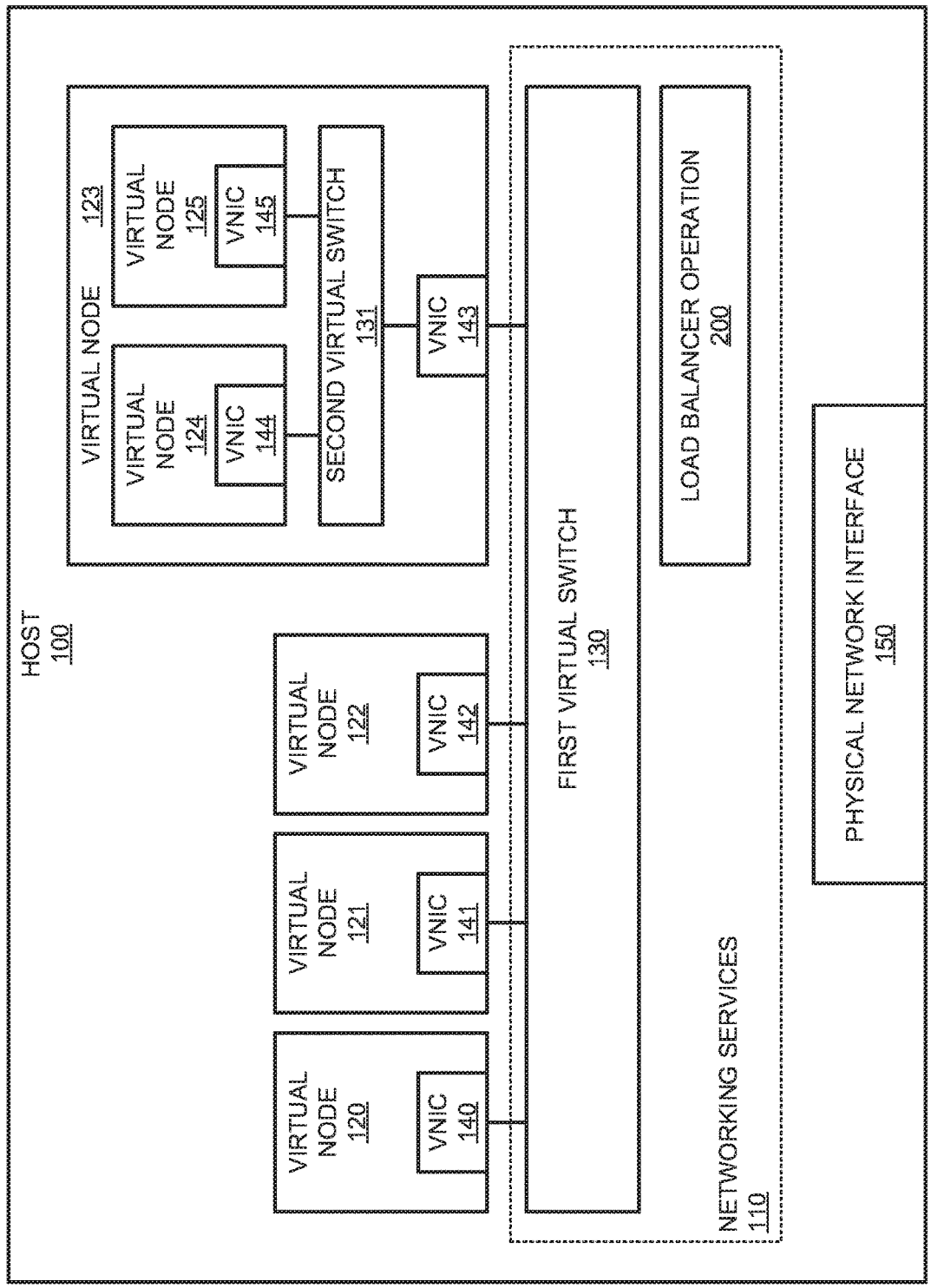
FIG. 1 illustrates a host that provides a platform for a plurality of virtual nodes according to an implementation.

The various examples disclosed herein provide enhancements for managing data packet communications for virtual nodes over a physical network interface. In particular, host computing systems may execute virtual switches that comprise software modules capable of providing switching operations, routing operations, distributed firewall operations, and the like. These modules may inspect the packets for various traits, such as internet protocol (IP) addresses, media access control (MAC) addresses, packet type information, or any other similar information, and provide forwarding operations based on the identified traits. The forwarding operations may include permitting a communication to be forwarded to the appropriate destination, blocking the communication, modifying the communication, or any other similar operation. The forwarding operations may include forwarding packets locally between nodes on the same host computing system, and may further include forwarding packets as they are received from secondary physical computing systems.

In some implementations, multiple virtual switches may be deployed on the same host computing system. For example, a first virtual switch may be coupled to a plurality of virtual machines. Further, within one of the virtual machines, a second virtual switch may execute that provides software defined networking operations for secondary virtual nodes within the virtual machine. These secondary virtual nodes may comprise full operating system virtual machines, or may include containers capable of sharing kernel resources provided by the host virtual machine.

In some examples, in addition to virtual switches and virtual nodes on a host computing system, a load balancer operation may be included that is used to manage network packets as they are received and/or transmitted over a physical network interface of the host. This load balancer operation may configure the physical network interface to identify traits or attributes within packets received over the interface and place the packets within appropriate processing queues, wherein the processing queues may be provided with a portion of clock cycles, processing cores, memory resources, or some other similar processing resource. By inspecting the packets at the physical network interface, the load balancer operation may ensure that packets for each virtual node are allocated a desired quality of service.

Here, in providing the configuration of the physical network interface, the load balancer operation may rely on information provided by a virtual switch executing on the host. This information may include dispatch statics and MAC identifiers for virtual nodes in communication with the virtual switch. To identify the information, the virtual switch may monitor packets as they are received at the virtual switch and identify MAC addresses for virtual nodes executing on the host. These may include virtual nodes that are in direct communication with the virtual switch (i.e. virtual machines with virtual network interfaces mapped to ports of the virtual switch), as well as one or more nested virtual nodes executing within the virtual nodes that are directly mapped to the virtual switch. For example, a virtual machine with a virtual network interface (VNIC) mapped to the virtual switch may further include a secondary virtual switch that provides connectivity for one or more containers (or secondary virtual machines). As a result, communications for the containers to other computing systems may be required to be communicated over the second virtual switch in the virtual machine, as well as the primary virtual machine executing on the host.

To ensure that the container running within the virtual machine is provided with a proper quality of service even when operating within the virtual machine, the virtual switch may be configured to identify communications with a source or destination MAC address for the container, and maintain dispatch statistics for the communications. These dispatch statistics may include, but are not limited to, packets transmitted and received for the MAC address associated with the container or bytes transmitted and received for the MAC address associated with the container. Based on the dispatch statistics for the container, as well as dispatch statistics for the other virtual nodes executing on the host, the load balancer operation may generate filters that classify packets as they are received at the physical network interface and ensure that each of the virtual nodes is receiving an adequate quality of service. These filters may be used to identify attributes, such as MAC addresses and other header information for packets received at the physical network interface, and place the packets into queues. Using the example above, the filters may identify a destination MAC address within a received packet and place the packet in the appropriate queue for processing.

FIG. 1 illustrates a host 100 that provides a platform for a plurality of virtual nodes according to an implementation. Host 100 includes virtual nodes 120-125, virtual switches 130-131, physical network interface 150, and load balancer operation 200 that works in conjunction with first virtual switch 130 to provide networking services 110. Virtual nodes 120-125 further includes VNICs 140-145 that provide connectivity to virtual switches 130-131.

In operation, host 100 provides a platform for the execution of virtual nodes 120-125, wherein virtual nodes 120-125 may comprise full operating system virtual machines or containers. Full operating system virtual machines execute via a hypervisor, and run their own operating system kernel via abstracted processing system resources, storage resources, network resources, and the like provided by the hosting hypervisor. Unlike virtual machines, containers, which may comprise Docker containers, Linux containers, or some other similar type of container, share host resources, such as kernel resources of the host operating system (from host 100) and any allocated shared binaries. The containers may include their own identifier space and file structure, and may be allocated separate virtual network interfaces on the host system.

In the present implementation, to provide the networking for virtual nodes 120-125, VNICs 140-145 are provided that communicate via first virtual switch 130 and second virtual switch 131. Virtual switches 130-131 comprise software modules capable of providing switching operations, routing operations, distributed firewall operations and the like. The virtual switches are responsible for forwarding packets between virtual nodes on the same host, and are further responsible for managing packets for the virtual nodes that are transmitted and/or received over physical network interface 150. In providing communications with other physical computing systems for the virtual nodes, load balancer operation 200 works in conjunction with physical network interface 150 to filter and classify packets as they are received from the physical network. By filtering packets as they are received over the network, load balancer operation 200 may ensure that packets are provided adequate processing resources of host 100. In particular, load balancer operation 200 may be used to configure physical network interface 150, such that packets received at the interface are placed in processing queues based on attributes within the packets. As a result of this configuration, load balancer operation 200 is responsible for configuring the physical network interface, but does not sit in the data path for the communicating packets.

Figure 2:
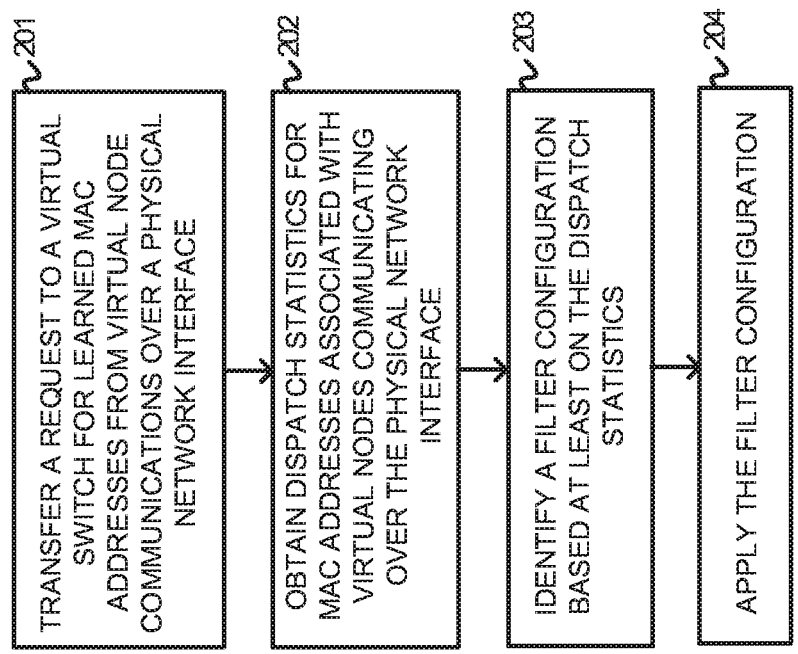
FIG. 2 illustrates a method of operating load balancer operation to configure packet filters for a physical network interface on a host according to an implementation.

FIG. 2 illustrates a method of operating a load balancer operation 200 to configure packet filters for a physical network interface on a host according to an implementation. The processes of FIG. 2 are described parenthetically in the paragraphs that follow with reference to systems and elements of host 100 of FIG. 1.

As depicted in FIG. 2, load balancer operation 200 as part of networking service 110 transfers (201) a request to a virtual switch for learned MAC addresses from virtual node communications over a physical network interface. For example, operation 200 may query first virtual switch 130 to determine MAC addresses for virtual nodes communicating via virtual switch 130, wherein first virtual switch 130 may identify virtual node communications over physical network interface 150, and inspect the packets to identify or learn the MAC addresses for the virtual nodes. In addition to identifying MAC addresses for each of the virtual nodes, first virtual switch 130 may further maintain dispatch statistics associated with each of the MAC addresses. These dispatch statistics may include, but are not limited to, the number of packets received and sent by each of the MAC addresses and/or the number of bytes received and sent for each of the MAC addresses.

Once the request is transferred by load balancer operation 200, load balancer operation 200 may further obtain (202) the dispatch statistics for the MAC addresses associated with virtual nodes communicating over the physical network interface via the virtual switch. In some implementations, this information may be obtained as key-value pairs where they key is representative of the MAC address for the particular virtual node, and the value is representative of the dispatch statistics for the particular MAC address. Thus, if all virtual nodes 120-125 were communicating over physical network interface 150 via first virtual switch 150, then the information obtained may include a MAC address associated with each virtual node, as well as dispatch statistics for each of the MAC addresses.

Once the statistics are obtained, load balancer operation 200 identifies (203) a filter configuration based on the dispatch statistics and applies (204) the filter configuration at the physical network interface, wherein applying the filter configuration may include adding, removing, or updating existing filters. This filter configuration may include filters that identify attributes, such as destination MAC addresses, in received packets at physical network interface 150 and classify the packets based on the destination MAC address. Thus, using the current example, filters may identify destination MAC addresses associated with virtual nodes 120-125, and classify the packets based on the destination MAC address. In some examples, in determining the filter configuration, operation 200 may ensure that each of the MAC addresses are receiving an adequate quality of service. This may include ensuring that packets for each of the virtual nodes are provided adequate processing resources, memory resources, or other similar computing resources. In some implementations, in managing the packets, physical network interface 150 may be capable of separating packets into various processing queues, wherein each of the queues is allocated a portion of processing resources, memory resources, and the like. For example, when a large number of packets are received at physical network interface 150 that are directed at a MAC address for virtual node 124, then load balancer operation 200 may configure physical network interface 150 to separate the packets for virtual node 124 based at least on the MAC address, such that packets for the other virtual nodes are not delayed in processing due to the requirements of virtual node 124.

In some implementations, when determining the filter configuration, load balancer operation 200 may be responsible for identifying new filters for newly identified MAC addresses with corresponding dispatch statistics, updating filters based the statistics for previously identified MAC addresses, or removing filters for "timed out" or expired MAC addresses that are no longer included in the statistics provided from first virtual switch 130. In particular, when a MAC address and corresponding statistics are received, load balancer operation 200 may first determine whether a filter exists for the MAC address. If a filter exists, the filter may be updated based on the dispatch statistics. In contrast, if a filter does not exist, a new filter may be generated based on the received dispatch statistics. Further, if dispatch statistics are not received for a MAC address from the virtual switch, but the MAC address was associated with a currently implemented filter, then load balancer operation 200 may remove the filter associated with the MAC address, as the MAC address may no longer be considered active on the host system. For example, when virtual node 122 initiates execution on host 100, first virtual switch 130 may identify new dispatch statistics associated with the MAC address for the virtual node. As the dispatch statistics are identified, the dispatch statistics are provided to operation 200, wherein operation 200 may add a filter that corresponds to the MAC address for virtual node 122. Once a filter is added, operation 200 may update the filter based on supplemental dispatch statistics identified by virtual switch 130. Further, if dispatch statistics are not received for the MAC address from virtual switch 130 during dispatch statistic update, operation 200 may remove the filter corresponding to the MAC address.

Although not demonstrated in the previous example, it should be understood that in some implementations, load balancer operation 200 may further be configured such that the filters are applied based on network overlays for the virtual nodes. In this implementation, when a virtual node connects to first virtual switch 130, first virtual switch 130 will identify a VNIC port identifier for the virtual node. For example, when virtual node 120 connects to first virtual switch 130, first virtual switch 130 may determine the VNIC port identifier associated with virtual node 120 and VNIC 140. Once VNIC 140 is mapped, first virtual switch may provide, as a mapping notification, a MAC address associated with the virtual node to load balancer operation 200 along with the VNIC port identifier for the virtual node. After being provided with the MAC address for the virtual node (and the VNIC port identifier), load balancer operation 200 may identify an overlay information associated with the MAC address, such as any outer header information for the overlay network, virtual extensible local area network (VXLAN) network identifier (VNI) information for the overlay network, or some other similar information for overlay network.

After the overlay information is obtained by load balancer operation 200 and maintained as part of an overlay record, load balancer operation 200 may again retrieve dispatch statistics for MAC addresses communicating over first virtual switch 130. In this example, in addition to the MAC addresses and dispatch statistics, the information from first virtual switch 130 may include a VNIC port identifier for each MAC address for the port on first virtual switch 130 that the MAC address was identified. For example, although virtual node 124 is allocated its own MAC address, first virtual switch will identify that the communications for virtual node 124 are received via the VNIC port identifier for VNIC 143 and virtual node 123. Based on the VNIC port identifier information from first virtual switch 130 as well as the maintained overlay record from the mapping notifications, load balancer operation 200 may determine whether a network overlay configuration (or overlay configuration) is used for the virtual node. If an overlay configuration is used for the VNIC port identifier, then a filter may be applied based on the overlay configuration (e.g. the outer header, VNI, and the like). Thus, rather than using the MAC address associated with a particular virtual node, the overlay configuration (overlay MAC address) associated with the VNIC port identifier may be used in generating a filter for physical network interface 150.

In another implementation, multiple MAC addresses for the virtual nodes may use the same outer header for encapsulation. As a result, operation 200 may be responsible for aggregating dispatch statistics for all of the MAC addresses that share the same outer header. For example, operation 200 may retrieve dispatch statistics from first virtual switch 130. Once the statistics are received, any MAC addresses that share an outer overlay MAC address may be aggregated and the dispatch statistics may be updated to reflect the aggregation. Once updated with the aggregated statistics for the MAC addresses, filters may be determined for physical network interface 150. Thus, rather than filtering based on individual MAC addresses for virtual nodes, load balancer operation 200 may filter based on a MAC address used in the encapsulation of multiple virtual nodes.

In some examples, load balancer operation 200 may be configured to, at intervals, ensure that any overlay information is accurate for the host system. In monitoring the overlay configuration, load balancer operation 200 may query a data structure or other software module that manages the overlay configurations for the MAC addresses to identify any overlay configuration information associated with a particular MAC address. As a result, for a first time period, load balancer operation 200 may be capable of configuring a filter for a MAC address based on a first overlay configuration for the MAC address. However, for a second time period, load balancer operation 200 may update the filter if the MAC address changes its overlay configuration or an overlay configuration is removed for the MAC address.

While not depicted in FIG. 2, it should be understood that first virtual switch 130 may only maintain information active virtual nodes communicating over first virtual switch 130. For example, once a MAC address is inactive for a timeout period, statistics for that MAC address may no longer be provided to load balancer operation 200. Moreover, while a single retrieval is demonstrated in FIG. 2 for load balancer operation 200, it should be understood that load balancer operation 200 may periodically or various intervals retrieve dispatch statistics for virtual nodes on host 100 to ensure that the filters accurately reflect the communication requirements of the nodes. Further, in some implementations, the virtual switch may provide the dispatch statistics for the virtual nodes without the requirement of a request.

Although demonstrated in the example of FIG. 2 using a single physical network interface, it should be understood that a host may include multiple physical network interfaces. As a result of this configuration, operation 200 may be repeated as required for each of the physical network interfaces of the host system. In particular, load balancer operation 200 may receive dispatch statistics corresponding to each of the physical network interfaces, and may implement filters based on the dispatch statistics corresponding to each of the network interfaces.

Figure 3:
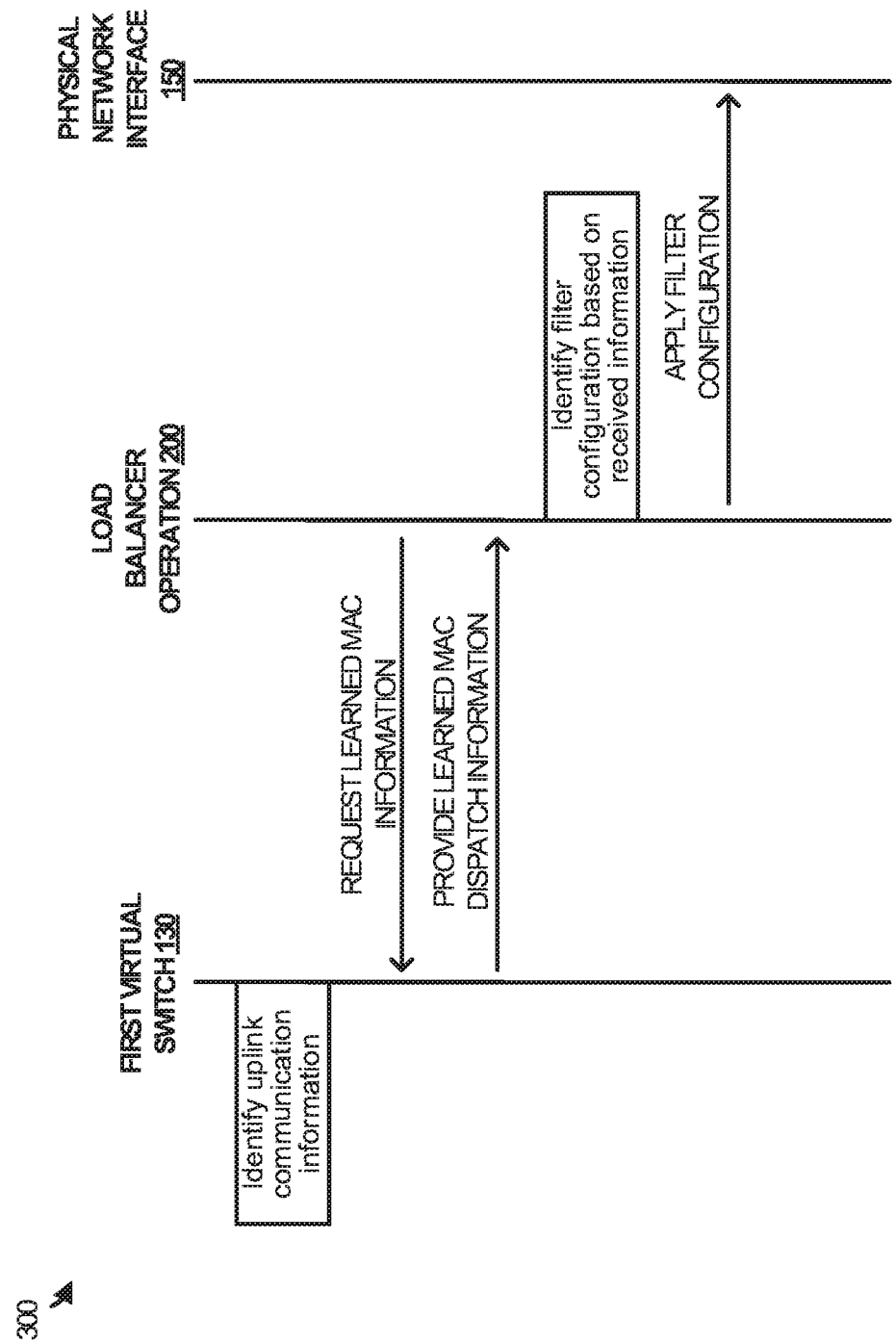
FIG. 3 illustrates a timing diagram of configuring packet filters for a physical network interface according to an implementation.

FIG. 3 illustrates a timing diagram 300 of configuring packet filters for a physical network interface according to an implementation. Timing diagram 300 includes first virtual switch 130, load balancer operation 200, and physical network interface 150 from host 100 of FIG. 1.

As depicted, first virtual switch 130 is configured to identify and learn uplink communication information for virtual nodes communicating via the virtual switch. This uplink information includes identifying when VNICs of the virtual nodes are mapped to ports on the virtual switch, identifying MAC address and VNIC port identifiers for virtual nodes communicating over the physical network interface via the virtual switch, dispatch statistics for the quantity of data being communicated by each MAC address, or other similar uplink information. As the data is maintained by first virtual switch 130, load balancer operation 200 may request learned MAC information from first virtual switch 130, and be provided with learned MAC dispatch information for virtual nodes communicating via first virtual switch 130. In some implementations, the dispatch information may be provided as key-value pairs wherein the keys are represented as the MAC addresses communicating over the virtual switch, and the value comprises quantifier information for the amount of data communicated by each of the virtual nodes.

Once the dispatch information is received that corresponds to the MAC addresses, load balancer operation 200 identifies filter configuration based on the received information (filters to add, update, or remove) and configures physical network interface 150 based on the filter configuration. In some implementations, load balancer operation 200 may identify filters to ensure that each of the virtual nodes is provided with adequate resources. For example, if one virtual node or MAC address were associated with a large quantity of traffic, load balancer operation 200 may be used to ensure that the traffic for the virtual node is allocated to a specific processing queue. This queue may be allocated with processing resources, memory resources, and the like that ensures that resources are adequately provided to each of the nodes. For example, if each virtual machine is to have a minimum quality of service, operation 200 may configure physical network interface 150, such that packets are filtered to queues to ensure that each of the virtual nodes receive packets to provide the required quality of service.

In some implementations, in determining the filter configuration for the MAC addresses, load balancer operation 200 may be configured to add, maintain, and remove filters based on the information provided from first virtual switch 130. In particular, when a new MAC address is identified as communicating over physical network interface 150 by first virtual switch 130, load balancer operation 200 may generate a new filter to identify packets for the new MAC address. Additionally, load balancer operation 200 may update the filter based on the dispatch statistics provided by first virtual switch 130. For example, packets for a MAC address may be placed in an initial processing queue for a first time period, but may be placed in a second processing queue for a second time period based on the updated dispatch statistics corresponding to the MAC address. Further, while maintaining a filter for a MAC address, load balancer operation 200 may further identify when the MAC address is no longer in use on the host based on the received dispatch statistics (e.g. statistics are not provided for the MAC address). Once the MAC address is identified as inactive, the filter corresponding to the MAC address may be removed, which may permit a new filter associated with a second MAC address to be implemented at physical network interface 150.

FIG. 4 illustrates a virtual switch data structure 400 to manage dispatch statistics according to an implementation. Virtual switch data structure 400 includes columns for MAC addresses 410, VNIC port identifiers (IDs) 412, and dispatch statistics 414. Although illustrated as a single table in FIG. 4, it should be understood that one or more linked lists, data trees, arrays, tables, and the like may be used in managing learned uplink data for the virtual nodes.

As described herein, as virtual nodes communicate over a physical network interface via a virtual switch, the virtual switch is configured to maintain dispatch statistics for each of the virtual nodes. In particular, the virtual switch may maintain the MAC address associated with the virtual node, the VNIC port ID that the virtual node is communicating over on the virtual switch, and dispatch statistics for the virtual node. In some implementations, such as the example demonstrated in host 100 of FIG. 1, a single VNIC port may be used for multiple virtual nodes. Thus, to maintain accurate statistics for each of the virtual nodes, the virtual switch may separate the communications based on the MAC address associated with the virtual node.

Referring to an example in virtual switch data structure 400, when a virtual node communicates over the physical network interface via the virtual switch, a row is added to data structure 400. For example, after identifying a communication from a new virtual machine associated with MAC address 424, MAC 424 may be added to the data structure along with the corresponding VNIC identifier 434, and any dispatch statistics. As the information is maintained in the data structure, the data structure may be queried or otherwise used to provide information to a load balancer operation. Based on the information from the data structure, the load balancer operation may update filters at the physical network interface to place packets into processing queues and ensure that each virtual node is receiving an adequate quality of service. For example, if a particular MAC address were communicating a large number of bytes over the physical network interface, the operation may separate communications for the MAC address into a separate processing queue to ensure that the other virtual nodes are not inhibited by the traffic.

Figure 5:
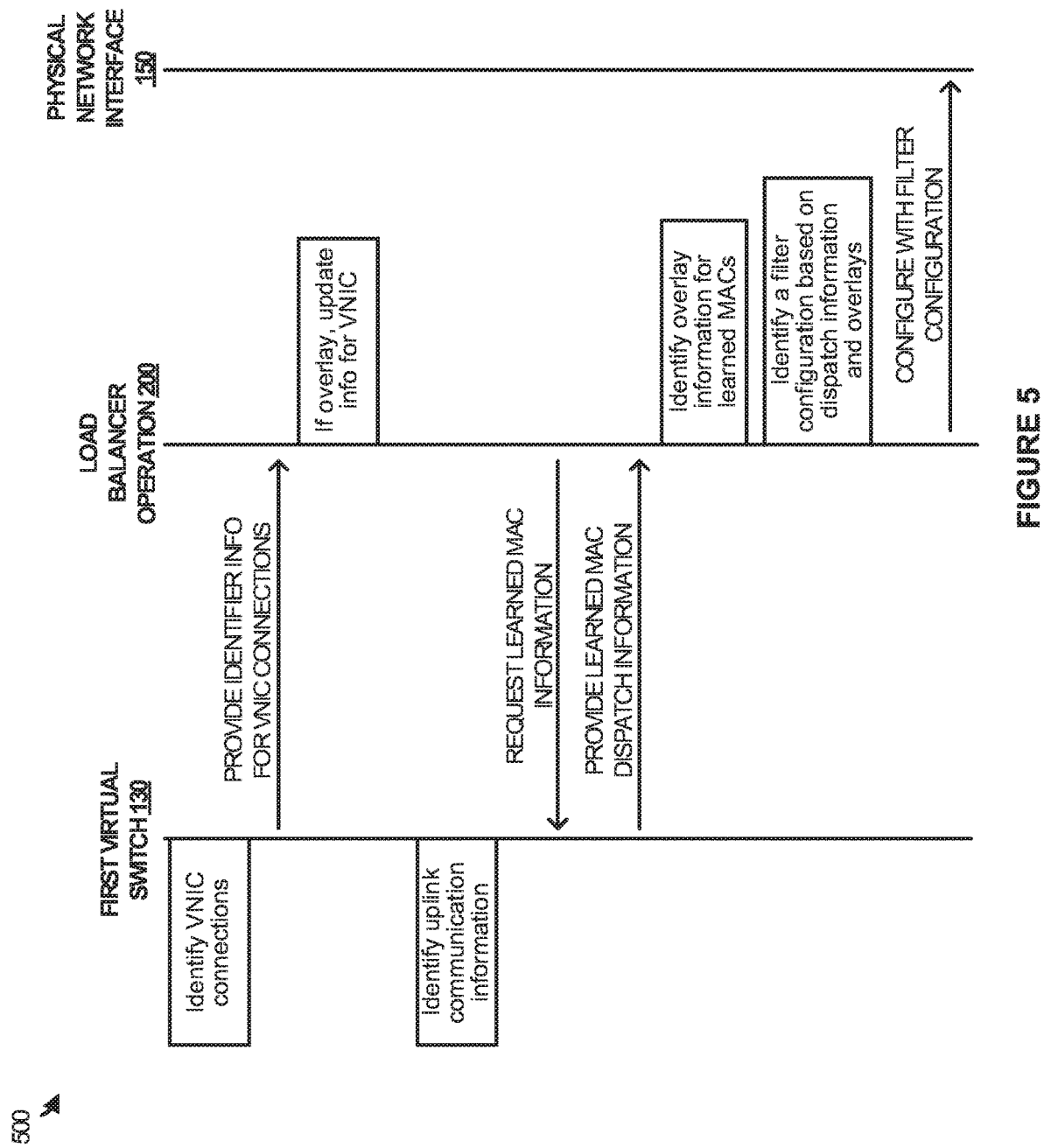
FIG. 5 illustrates a timing diagram of configuring packet filters for a physical network interface according to an implementation.

FIG. 5 illustrates a timing diagram 500 of configuring packet filters for a physical network interface according to an implementation. Timing diagram 500 includes first virtual switch 130, load balancer operation 200, and physical network interface 150 from host 100 of FIG. 1.

In operation, first virtual switch 130 will identify VNIC connections to the virtual switch. For example, when VNIC 140 of virtual node 120 is mapped to a port on first virtual switch 130, first virtual switch 140 will identify the connection and provide identifier information for the VNIC connection to load balancer operation 200. This identifier information is provided as a mapping notification and may include a VNIC port identifier for the connection (an identifier associated with VNIC 140 and/or the logical port), and a MAC address associated with the virtual node making the connection (MAC address for virtual node 120). Once the identifier information is provided, load balancer operation 200 will determine if there is an overlay associated with the MAC address. In determining whether an overlay is used, load balancer operation 200 may consult a data structure or other software module that manages information for the various overlays used by the virtual nodes in a computing environment. Based on the consultation, load balancer operation 200 may generate a record with information such as header information, VNI information, and the like for the overlay network. This information may also be updated if changes are made to the overlay configuration for a particular virtual node.

Once the VNICs are mapped to ports of first virtual switch 130, first virtual switch 130 may monitor uplink communication information for virtual nodes over physical network interface 150. In monitoring the uplink information, first virtual switch 130 may maintain at least one data structure that associates MAC addresses for each communicating node with dispatch statistics and a VNIC port identifier for each MAC address. Based on information from the data structure, load balancer operation 200 may determine filters to be applied at physical network interface 150.

In the present implementation, load balancer operation 200 may request and be provided with learned MAC dispatch information from the data structure maintained by first virtual switch 130. Once the information is received, which includes the MAC addresses with their corresponding VNIC port identifiers and dispatch statistics, load balancer operation 200 will identify overlay information for each of the MAC addresses, and identify a filter configuration based on the dispatch information and overlays. Once the filter configuration is determined, the filter configuration may be applied at physical network interface 150 by adding, removing, and updating packet filters at the interface. In particular, because load balancer operation 200 already determined which of the VNIC port identifiers are associated with an overlay network, each of the MAC addresses with the same VNIC port identifier may be associated with the same overlay network configuration. For example, when virtual node 123 is mapped to first virtual switch 130, the VNIC port identifier may be registered with an overlay network. Consequently, when MAC addresses are identified as communicating over the same VNIC port identifier, those MAC addresses may be associated with the overlay network that was previously identified for virtual node 123. Advantageously, rather than using the MAC address associated with the virtual node for filters, packets may be filtered for the virtual node based on the header configuration required by the overlay network.

In some implementations, the filter configuration generated by load balancer operation 200 may filter packets using both MAC addresses for the individual virtual nodes as well as overlay network configurations (overlay MAC addresses) for the virtual nodes. Thus, both virtual nodes that use an overlay configuration and those that do not require an overlay configuration may be classified at physical network interface 150.

Figure 6:
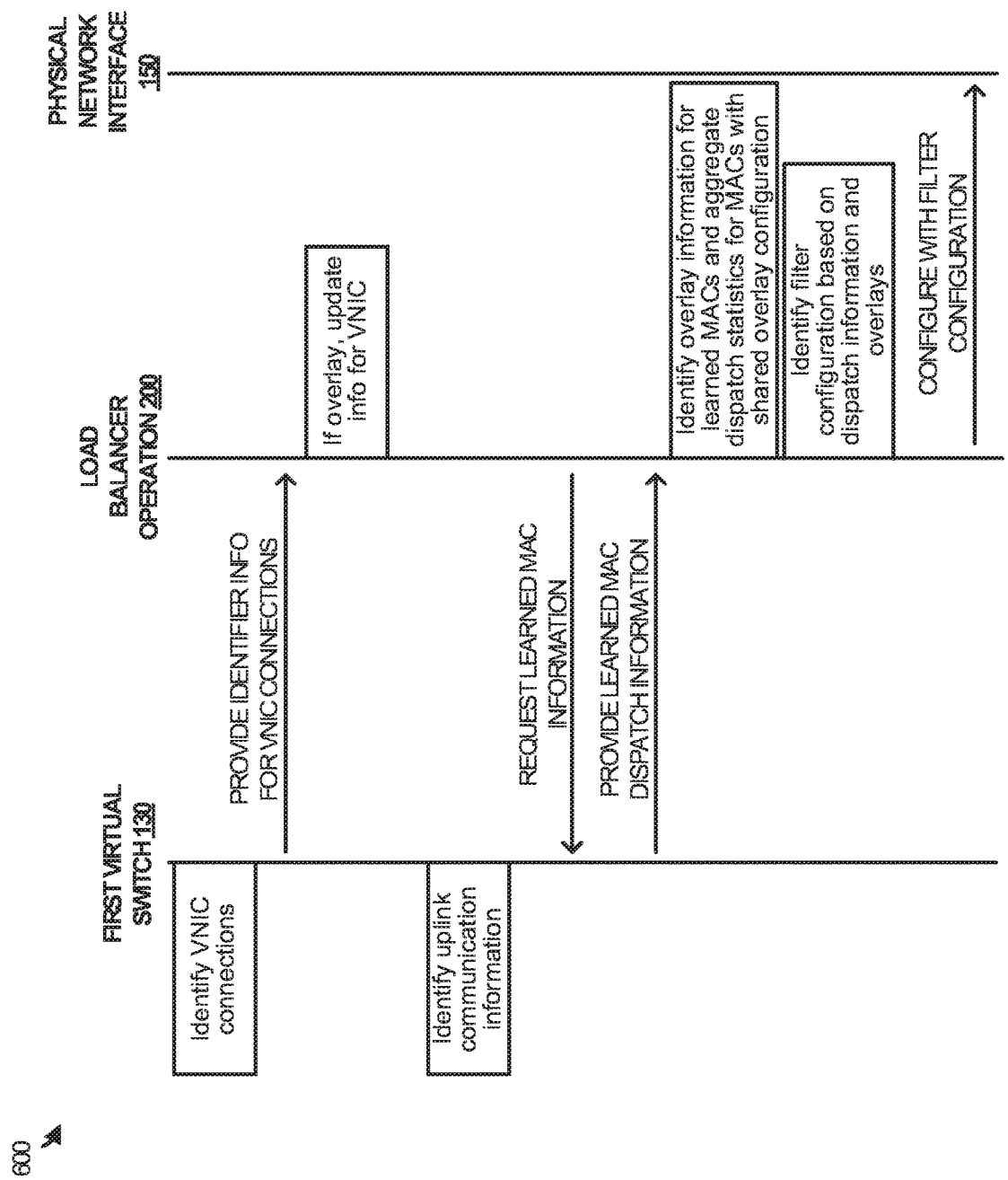
FIG. 6 illustrates a timing diagram of configuring packet filters for a physical network interface according to an implementation.

FIG. 6 illustrates a timing diagram 600 of configuring packet filters for a physical network interface according to an implementation. Timing diagram 600 includes first virtual switch 130, load balancer operation 200, and physical network interface 150 from host 100 of FIG. 1.

As depicted, and similar to the operations described above with respect to timing diagram 500 of FIG. 5, first virtual switch 130 identifies when VNICs for virtual nodes are mapped to first virtual switch 130. Once a VNIC is mapped, a VNIC port identifier and MAC address associated with the virtual node being mapped is provided to and obtained by load balancer operation 200. Once information for a mapped node is obtained via a notification from the virtual switch, load balancer operation 200 further determines whether an encapsulation configuration is used for the particular VNIC port identifier, and maintains any encapsulation information for the VNIC port identifier for future filters on physical network interface 150. This encapsulation information may include outer header information for the encapsulation, VNI information, or any other similar information.

Once the encapsulation information is determined for the various VNIC port identifiers, first virtual switch 130 may identify uplink communication information for virtual nodes communicating over physical network interface 150 via first virtual switch 130. This uplink communication information may include which MAC addresses are communicating over the virtual switch with physical network interface 150, which VNIC port identifier for virtual switch 130 corresponds to each MAC address, and dispatch statistics for each of the MAC addresses. While the identifying the uplink communication information, load balancer operation 200 may request learned MAC information from first virtual switch 130 and be provided with learned MAC dispatch information. In some implementations, the MAC dispatch information may include learned MAC addresses that are communicating over the virtual switch with physical network interface 150, which VNIC port identifier for virtual switch 130 corresponds to each MAC address, and dispatch statistics for each of the MAC addresses.

Based on the information provided, operation 200 may identify any overlay information for each of the learned MAC addresses, and aggregate dispatch statistics for MACs with a shared overlay configuration. In particular, MAC addresses that share an outer encapsulation MAC address may have their corresponding dispatch statistics aggregated, and once aggregated, have the aggregated statistics used to update the dispatch statistics. Once the dispatch statistics are updated with the aggregated dispatch statistics, load balancer operation 200 may identify a filter configuration based on the dispatch statistics and the overlay configurations, and configure physical network interface 150 with the appropriate filters, which may include adding, removing, or updating filters at the interface. In at least one implementation, by aggregating the statistics, a filter may be generated for virtual nodes that share an encapsulation MAC address, permitting physical network interface 150 to identify packets associated with the virtual nodes using the encapsulation MAC address.

For example, referring to virtual nodes 120-125, virtual nodes 124-125 may each share an overlay configuration, wherein the outer header of packets for virtual nodes 124-125 may share the same MAC address. As a result, rather than configuring filters that identify the individual MAC addresses associated with virtual nodes 124-125, which would be located in the inner header, load balancer operation 200 may define filters that identify the MAC address associated with the encapsulation configuration. Thus, if virtual nodes 124-125 were identified as transmitting and/or receiving a large number of packets using the dispatch statistics, then a filter may be applied at physical network interface 150 that classifies packets of virtual nodes 124-125 into a particular processing queue based on the MAC address associated with the encapsulation.

Figure 7:
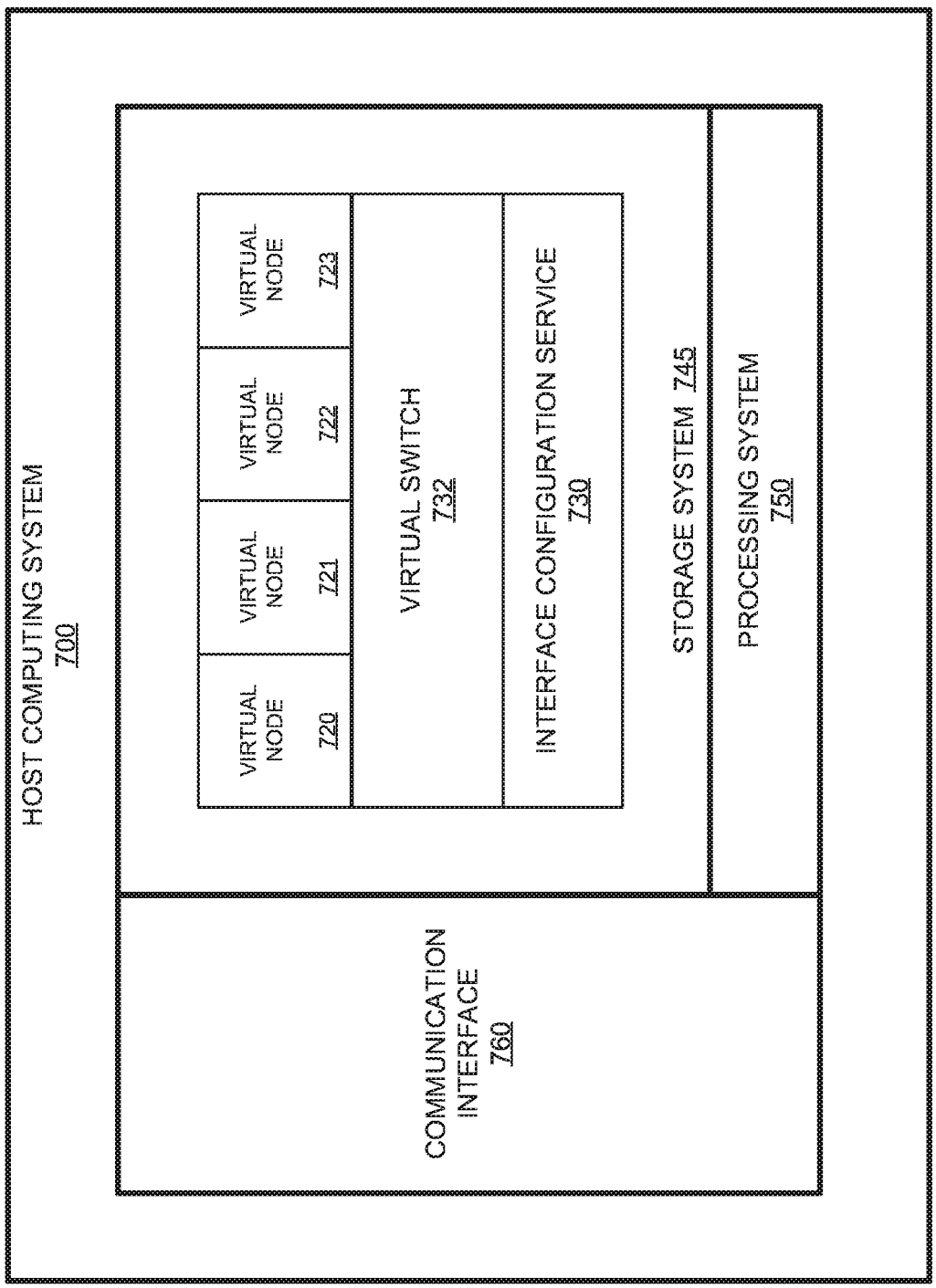
FIG. 7 illustrates a host computing system for a plurality of virtual nodes according to an implementation.

FIG. 7 illustrates a host computing system 700 for a plurality of virtual nodes according to an implementation. Host computing system 700 is representative of any computing system or systems with which the various operational architectures, processes, scenarios, and sequences disclosed herein for a host can be implemented. Host computing system 700 is an example of host 100 of FIG. 1, although other examples may exist. Host computing system 700 includes storage system 745, processing system 750, and communication interface 760. Processing system 750 is operatively linked to communication interface 760 and storage system 745. Communication interface 760 may be communicatively linked to storage system 745 in some implementations. Host computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is an example of physical network interface 150 and may be configured to communicate with other host computing systems in a computing environment, and may further be configured to communicate with one or more other networked computing systems and devices. Communication interface 760 may include hardware and software systems capable of filtering packets based on a configuration provided by interface configuration service 730.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device, but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises virtual nodes 720-723, virtual switch 732, and interface configuration service 730 (representative of load balancer operation 200 of FIG. 1). The operating software on storage system 745 may further include an operating system, utilities, drivers, network interfaces, applications, or some other type of software. When read and executed by processing system 750 the operating software on storage system 745 directs host computing system 700 to operate as described herein.

In operation, processing system 750 executes virtual nodes 720, wherein virtual nodes 720-723 may comprise full operating system virtual machines or containers. To facilitate communications for the virtual nodes, processing system 750 further executes virtual switch 732, wherein virtual switch 732 may inspect packets to and from the virtual nodes and forward or block the packets based on the inspection. Here, in addition to the packet forwarding operations provided by virtual switch 732, virtual switch 732 may further maintain dispatch statistics for virtual nodes 720-723. These dispatch statistics may represent a number of packets and/or bytes transmitted and received by each MAC address (associated with a virtual node) over communication interface 760. In particular, interface configuration service 730 may, when read and executed by processing system 750, direct processing system 750 to obtain dispatch statistics associated with MAC addresses for virtual nodes executing on host computing system 700. In some implementations, the dispatch statistics may come as a key-value pair, wherein the MAC address for a virtual node represents the key and the dispatch statistics represent the value. Based on the dispatch statistics, interface configuration service 730 directs processing system 750 to determine a filter configuration for communication interface 760 and apply the filter configuration at communication interface 760. This filter configuration may include one or more filters that identify attributes, such as destination MAC addresses in packets received at communication interface 760, and place the packets in a corresponding processing queue.

In some implementations, in determining the filter configuration, interface configuration service may be used to ensure that each of the virtual nodes are receiving an adequate quality of service. As an example, if a MAC address for virtual node 720 were identified to receiving a large number of packets, interface configuration service 730 may be used to apply a filter that places packets for virtual node 720 in a separate processing queue than packets received for virtual nodes 721-723. These processing queues may be allocated processing cores or clock cycles for processing system 750, memory resources, or some other similar processing resource. Thus, a packet filter may be used to identify the MAC addresses associated with virtual nodes 720-723 and place the packets within the appropriate processing queue.

In some examples, virtual nodes 720-723 may use encapsulation, wherein the encapsulation may include a different header information (e.g. MAC address) than the MAC address associated with the virtual node. To provide this implementation, interface configuration service 730 may further obtain VNIC port identifiers for virtual nodes coupled to virtual switch 732, and use the VNIC port identifiers to determine whether a MAC address corresponds to an overlay network configuration. For example, when virtual node 720 is mapped to virtual switch 732, interface configuration service 730 may obtain a VNIC port identifier associated with the mapping along with a MAC address for virtual node 720. Based on the obtained information, interface configuration service 730 may determine whether an overlay configuration is associated with the virtual node. If an overlay configuration is associated with the VNIC port identifier, then the MAC address (or other overlay information) for the overlay configuration may be used for the filtering of packets at communication interface 760. However, if an overlay configuration is not associated with the VNIC port identifier, then the MAC address identified by virtual switch 732 may be used in filtering the packets at communication interface 760.

In some implementations, multiple virtual nodes may share an outer-header and MAC address for encapsulation. For example, virtual nodes 720 and 721 may share and outer encapsulation header. As a result of this configuration, interface configuration service 730 may aggregate the statistics for each of the virtual nodes, and configure a filter based on the aggregated statistics. Thus, although dispatch statistics for virtual nodes 720-721 may be received as separate values from virtual switch 732, wherein the dispatch statistics for each node are associated with a unique MAC address for virtual nodes 720-721, interface configuration service 730 may aggregate the dispatch statistics such that they apply to an outer encapsulation MAC address for virtual nodes 720-721. Using the outer MAC address, if communication interface 760 is only capable of filtering or classifying packets based on the outer header, communication interface 760 may filter packets for virtual nodes 720-721 together due to their shared MAC address.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing packet filters for a physical network interface of a host computing system, the method comprising:
   obtaining dispatch statistics for media access control (MAC) addresses associated with virtual nodes communicating over the physical network interface via a virtual switch;
   determining, for the MAC addresses, one or more network overlay configurations associated with one or more of the MAC addresses;
   identifying a filter configuration based on the dispatch statistics and the one or more network overlay configurations, wherein the filter configuration classifies received packets at the physical network interface into processing queues based on attributes identified in the received packets; and
   applying the filter configuration at the physical network interface.

2. The method of claim 1, wherein the dispatch statistics comprise:
   a number of packets transmitted by each MAC address of the MAC addresses;
   a number of packets received by each MAC address of the MAC addresses;
   a number of bytes transmitted by each MAC address of the MAC addresses; and/or
   a number of bytes received by each MAC address of the MAC addresses.

3. The method of claim 1, wherein the method further includes transferring a request to the virtual switch for the dispatch statistics.

4. The method of claim 1, wherein a subset of the virtual nodes executes within a second subset of the virtual nodes, and wherein the second subset of the virtual nodes comprise virtual network interfaces mapped to the virtual switch.

5. The method of claim 1, wherein the virtual nodes comprise virtual machines or containers.

6. The method of claim 1, wherein the attributes identified in the received packets comprise destination MAC addresses identified in the received packets.

7. The method of claim 1 further comprising:
   receiving mapping notifications indicative of one or more of the virtual nodes being mapped to the virtual switch, wherein the mapping notifications comprise a virtual network interface (VNIC) port identifier for each of the one or more virtual nodes and a MAC address for each of the one or more virtual nodes; and
   maintaining an overlay record indicative of whether each VNIC port identifier for the one or more virtual nodes corresponds to a network overlay configuration;
   wherein obtaining the dispatch statistics for the MAC addresses comprises obtaining the MAC addresses with each MAC address of the MAC addresses associated with a VNIC port identifier and corresponding dispatch statistics;
   wherein determining, for the MAC addresses, the one or more network overlay configurations comprises determining, for the MAC addresses, the one or more network overlay configurations based on one or more VNIC port identifiers associated with the one or more MAC addresses and the overlay record.

8. The method of claim 1 further comprising:
   identifying whether two or more MAC addresses of the MAC addresses share an overlay MAC address;
   if two or more MAC addresses of the MAC addresses share an overlay MAC address:
      aggregating the dispatch statistics for the two or more MAC addresses; and
      updating the dispatch statistics with the aggregated dispatch statistics for the two or more MAC addresses.

9. A computing apparatus comprising:
   one or more non-transitory computer readable storage media;
   a processing system operatively coupled to the one or more non-transitory computer readable storage media; and
   program instructions stored on the one or more non-transitory computer readable storage media to manage packet filters of a physical network interface of a host computing system that, when read and executed by the processing system, direct the processing system to at least:
      obtain dispatch statistics for media access control (MAC) addresses associated with virtual nodes communicating over the physical network interface via a virtual switch;
      determine, for the MAC addresses, one or more network overlay configurations associated with one or more of the MAC addresses;
      identify a filter configuration based on the dispatch statistics and the one or more network overlay configurations, wherein the filter configuration classifies received packets at the physical network interface into processing queues based on attributes identified in the received packets; and
      apply the filter configuration at the physical network interface.

10. The computing apparatus of claim 9, wherein the dispatch statistics comprise:
 a number of packets transmitted by each MAC address of the MAC addresses;
 a number of packets received by each MAC address of the MAC addresses;
 a number of bytes transmitted by each MAC address of the MAC addresses; and/or
 a number of bytes received by each MAC address of the MAC addresses.

11. The computing apparatus of claim 9, wherein the attributes identified in the received packets comprise destination MAC addresses identified in the received packets.

12. The computing apparatus of claim 9, wherein a subset of the virtual nodes executes within a second subset of the virtual nodes, and wherein the second subset of the virtual nodes comprise virtual network interfaces mapped to the virtual switch.

13. The computing apparatus of claim 9, wherein the virtual nodes comprise virtual machines or containers.

14. The computing apparatus of claim 9, wherein the program instructions further direct the processing system to:
 receive mapping notifications indicative of one or more of the virtual nodes being mapped to the virtual switch, wherein the mapping notifications comprise a virtual network interface (VNIC) port identifier for each of the one or more virtual nodes and a MAC address for each of the one or more virtual nodes; and
 maintain an overlay record of whether each VNIC port identifier for the one or more virtual nodes corresponds to a network overlay configuration;
 wherein obtaining the dispatch statistics for the MAC addresses comprises obtaining the MAC addresses with each MAC address of the MAC addresses associated with a VNIC port identifier and corresponding dispatch statistics;
 wherein determining, for the MAC addresses, the one or more network overlay configurations comprises determining, for the MAC addresses, the one or more network overlay configurations based on one or more VNIC port identifiers associated with the one or more MAC addresses and the overlay record.

15. The computing system of claim 9, wherein the program instructions further direct the processing system to:
 identify whether two or more MAC addresses of the MAC addresses share an overlay MAC address;
 if two or more MAC addresses of the MAC addresses share an overlay MAC address:
  aggregate the dispatch statistics for the two or more MAC addresses; and
  update the dispatch statistics with the aggregated dispatch statistics.

16. An apparatus comprising:
 one or more non-transitory computer readable storage media;
 program instructions stored on the one or more non-transitory computer readable storage media to manage packet filters of a physical network interface of a host computing system that, when read and executed by a processing system, direct the processing system to at least:
  obtain dispatch statistics for media access control (MAC) addresses associated with virtual nodes communicating over the physical network interface via a virtual switch;
  determine, for the MAC addresses, one or more network overlay configurations associated with one or more of the MAC addresses;
  identify a filter configuration based on the dispatch statistics and the one or more network overlay configurations, wherein the filter configuration classifies received packets at the physical network interface into processing queues based on attributes identified in the received packets; and
  apply the filter configuration at the physical network interface.

17. The apparatus of claim 16, wherein the dispatch statistics comprise:
 a number of packets transmitted by each MAC address of the MAC addresses;
 a number of packets received by each MAC address of the MAC addresses;
 a number of bytes transmitted by each MAC address of the MAC addresses; and/or
 a number of bytes received by each MAC address of the MAC addresses.

18. The apparatus of claim 16, wherein the program instructions further direct the processing system to:
 identify whether two or more MAC addresses of the MAC addresses share an overlay MAC address;
 if two or more MAC addresses of the MAC addresses share an overlay MAC address:
  aggregate the dispatch statistics for the two or more MAC addresses; and
  update the dispatch statistics with the aggregated dispatch statistics.

* * * * *